United States Patent [19]

Köhler

[11] 4,335,599

[45] Jun. 22, 1982

[54] DEVICE FOR GENERATING A REFERENCE SIGNAL CORRESPONDING TO A GIVEN OPERATIONAL STATE OF A FOUR-CYCLE INTERNAL COMBUSTION ENGINE

[75] Inventor: Karl-Heinz Köhler, Ingolstadt, Fed. Rep. of Germany

[73] Assignee: Audi NSU Auto Union Aktiengesellschaft, Neckarsulm, Fed. Rep. of Germany

[21] Appl. No.: 165,601

[22] Filed: Jul. 3, 1980

[30] Foreign Application Priority Data

Jul. 7, 1979 [DE] Fed. Rep. of Germany ....... 2927538

[51] Int. Cl.[3] .......... G01M 15/00

[52] U.S. Cl. .......... 73/116

[58] Field of Search .......... 73/116; 123/414, 415, 123/428, 478; 324/379, 392

[56] References Cited

U.S. PATENT DOCUMENTS 3,625,054 12/1971 Vesper et al. .......... 73/116 X 4,156,411 5/1979 Crall et al. .......... 123/415

4,258,324 3/1981 Henrich .......... 324/392

*Primary Examiner*—Jerry W. Myracle

*Attorney, Agent, or Firm*—Karl F. Ross

[57] ABSTRACT

A reference signal corresponding to a predetermined state in the operation of a four-cycle internal combustion engine and especially an internal combustion engine with an odd number of cylinders, is produced by combining the pulses from a pulse generator responding to the position of the crankshaft and emitting an indicator signal with a signal generator, e.g. of the Hall generator type, which emits an H signal during a first angle range of the cam shaft which rotates at one half the speed of the crankshaft and a zero signal during the second angle range with the positions of the first angle range and the second angle range so selected that the indicator signal alternately appears during the H and zero signal. An AND gate receiving both sets of signals generates the reference signal at its output when the input is coincidentally triggered by both an indicator signal and an H signal.

4 Claims, 8 Drawing Figures

DEVICE FOR GENERATING A REFERENCE SIGNAL CORRESPONDING TO A GIVEN OPERATIONAL STATE OF A FOUR-CYCLE INTERNAL COMBUSTION ENGINE

FIELD OF THE INVENTION

My present invention relates to a device for generating a reference signal corresponding to a predetermined state in the operation of a four-cycle internal combustion engine and, more particularly, to an internal combustion engine having an odd number of cylinders, the engine being provided within an impulse generator having a post-connected triggering threshold which, in a given position of the crankshaft of the engine, emits an indicator signal which can be used for the production of the reference signal.

BACKGROUND OF THE INVENTION

The purely mechanical control devices used for internal combustion engines as for instance interrupting mechanisms for the ignition, mechanical triggers for direct fuel injection etc. have often proved too erratic and insufficiently adaptable for achieving optimum results. Non-mechanical, electronically operated regulating units require extremely precise reference signals which correspond to given operational states of the internal combustion engine and with whose help the internal combustion engine and the electronic regulating unit are synchronized. Any lack of precision in the reference signals annuls the advantages of a more exact regulation, which could result from the use of an electronic regulating unit.

The derivation of a reference signal for the ignition of an internal combustion engine from an impulse generator is known from German AS 25 04 843. This impulse generator scans by means of a sensor the markings placed on an engine component, e.g. a flywheel, rotating synchronously with the crankshaft. If the approach is applied to a four cycle internal combustion engine, then the number of markings is one half as large as the number of the cylinders. Indeed, as each cylinder fires only at every second revolution of the crankshaft, each indicator signal is used for two cylinders. Such an arrangement, however, creates difficulties in the case of internal combustion engines with an odd number of cylinders since the intervals between ignitions do not correspond to 180° turns of the crankshaft, i.e. not all indicator signals may be allowed to produce reference signals which for instance would signal the beginnings of the work-cycles of a piston-cylinder unit.

OBJECT OF THE INVENTION

The object of the instant invention is to create a device which with simple means allows the production of reference signals which always correspond to certain operational states of a four-cycle internal combustion engine.

This object, and others which will become apparent hereinafter, are achieved in accordance with the invention by providing a signal generator which emits a H signal during a first angle range of a shaft rotating at one half the speed of the crankshaft and a zero signal during a second angle range whereby the positions of the first angle range and the second angle range are so selected that indicator signals alternately appear during an H and the zero signal. An AND gate is connected to the signal generator and to the pulse generator and produces an output corresponding to the reference signal when the input is coincidentally triggered by both an indicator signal and an H signal.

Each reference signal generated by the device according to the instant invention defines unequivocally the operational state of the internal combustion engine because the reference signals respond not only to the position of the crankshaft but, with the help of the signals produced by the signal generator, also take into account the position of the camshaft. When the device is used for the ignition of a five-cylinder engine for example, five markings are placed preferably on the crankshaft; however, only every second indicator signal results in a reference signal, so that during two revolutions of the crankshaft five reference signals are produced. The device of the instant invention can also advantageously be used on an engine with an even number of cylinders. A mark can be provided for each cylinder on the crankshaft and thus it becomes possible to operate for instance the cylinders with different ignition or fuel injection timings.

According to a feature of the invention, the position of the first angle range is selected such that the H signal begins shortly before the start of an indicator signal with respect to the duration of one revolution of the crankshaft.

This permits elimination with simple means of the parasitic impulses picked up by the impulse generator. These parasitic impulses could be originated by screw holes or other irregularities in the crank shaft. All parasitic impulses received before the beginning of the first angle range are thus suppressed because the signal generator produces a zero signal during this period. Consequently the meticulously uniform finishing of the crankshaft or the fly-wheel required to foreclose the possibility of generating parasitic impulses, may be limited to a small angle range just before the marking.

It is obvious that after the indicator impulse has been transmitted as a reference signal, the circuit must remain inactive until the H signal disappears as otherwise parasitic impulses arising after the indicator impulse could be relayed as reference signals. This can be achieved for instance by using the ascending flank of the H signal to activate the circuit and the descending flank of the indicator impulse to deactivate it or by employing a timing device which deactivates the circuit for a certain time after a reference signal has been emitted.

According to another feature of the invention, the size of the first angle range is selected such that the H signal ends shortly after the indicator signal.

In this manner the angle range in which the H signal is produced is kept small and is so elected that the H signal begins at a short distance before an indicator signal and ends shortly after it. Thereby, both the afore mentioned flank control of the H signal and the use of a timing device can be avoided. The parasitic impulses, which would arise shortly after the indicator signal, can be eliminated through this geometric arrangement.

When the internal combustion engine is equipped with a spark distributor, the impulse generator can be an inductive generator and the signal generator can comprise a Hall generator activated by a slotted disk connected with and driven by a camshaft of the engine whereby the widths of the disk slots activating the Hall generator corresponds to the size of the first angle range.

BRIEF DESCRIPTION OF THE DRAWING

The instant invention is described below in further detail with reference to the accompanying schematic drawing in which.

SPECIFIC DESCRIPTION

Figure 1:
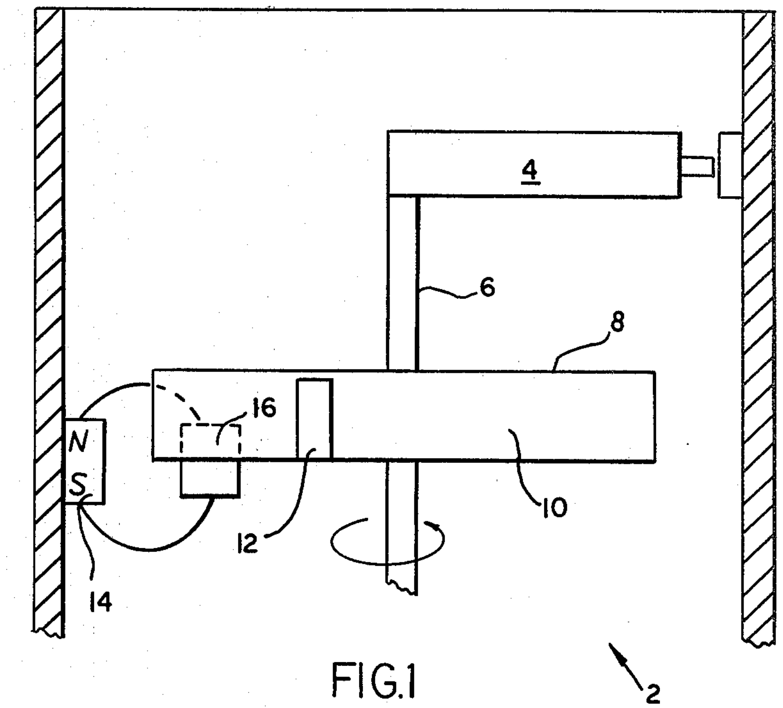
FIG. 1 is a section which shows the disposition of a Hall generator in a spark distributor.

FIG. 1 illustrates a spark distributor 2 with its distributor finger 4 and impeller shaft 6. The impeller shaft 6 carries a disk 8 a flange of which is bent into a pot-like shape 10 and has a slot 12. The flange 10 and the slot 12 rotate in a space provided between a magnet 14 and a Hall generator 16.

The device functions such that each time the slot 12 transits the space situated between the magnet 14 and the Hall generator 16, the magnetic field at the Hall generator 16 is modified and the Hall generator emits an H signal during the slot's 12 passage through this space.

Figure 2:
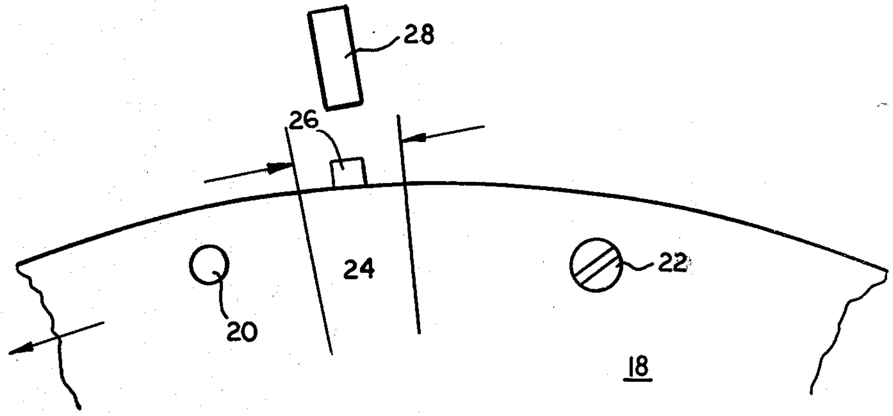
FIG. 2 is an elevational detail which shows the disposition of an impulse generator and of an indicator on the fly-wheel.

FIG. 2 illustrates a flywheel 18 with a bore 20 and a screw hole with a screw 22. On the rim of the flywheel, outwardly, in a homogenous, smooth sector 24 an indicator pin 26 is mounted. The rotation of the flywheel 18 carries the indicator pin at close range in front of an inductive generator 28 and produces in the latter by induction at each passage of the indicator pin 26 an indicator impulse. As the homogeneity of the flywheel is disturbed by the bore 20 and the screw hole 22 these cavities will also cause the inductive generator to produce a parasitic impulse which however will have an amplitude less than that of the indicator impulse.

Figure 3:
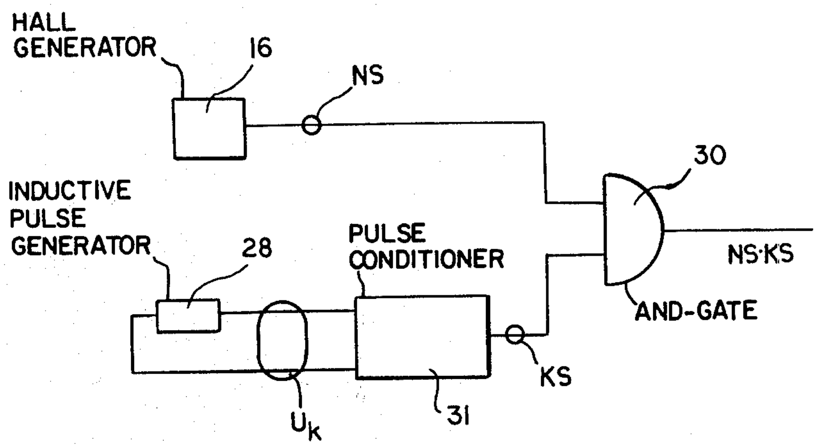
FIG. 3 is a schematic representation of the signal circuitry.

FIG. 3 shows the circuitry set up for processing the H signal emanating from the Hall generator and the indicator impulses produced by the inductive generator. The output of the Hall generator 16 serves as an input for an AND gate 30. The signals of the inductive generator 28 are led into an impulse conditioner 31 provided with a triggering threshold designed to equalize the different amplitude levels of the impulses. The output of the impulse conditioner 31 constitutes the other input of the AND gate 30. The desired reference signal appears at the output of the AND gate.

Figure 4:
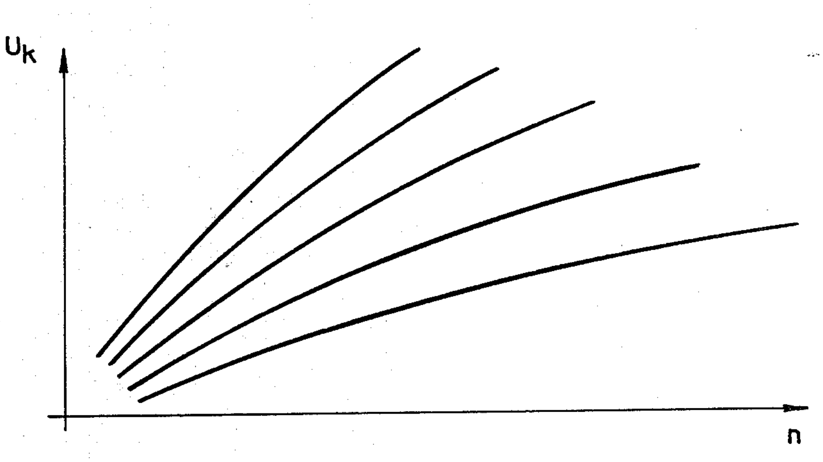
FIG. 4 is a graph which shows the relationship between RPM and air gap on one hand and impulse generator voltage on the other hand.

FIG. 4 represents a diagram reflecting the dependence of the signal voltage produced by the inductive generator on both the RPM of the flywheel 18 and the air gap between the inductive generator 28 and the indicator pin 26. The various curves show varying tensions generated with different air gaps indicating that smaller air gaps result in higher tensions. The diagram makes it equally clear that with a constant air gap, the signal voltage will increase as the rotation of the flywheel accelerates.

Figure 5A:
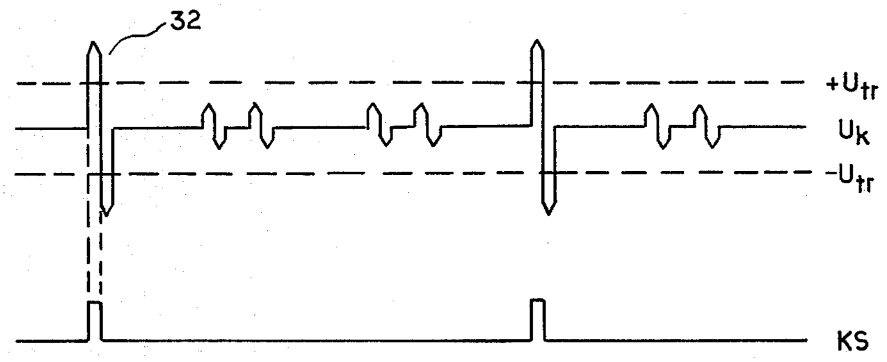
FIGS. 5*a* and 5*b* are diagrams of the impulse generator voltage at low and high speeds of revolution, respectively.
Figure 5B:
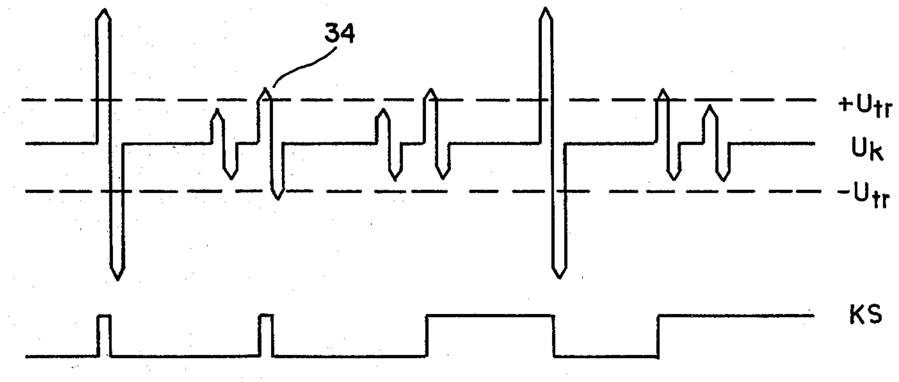

FIG. 5*a* shows the voltage signal $U_{ck}$ produced by the induction generator at a low speed of revolutions as well as the positions of the triggering thresholds $+U_{tr}$ and $-U_{tr}$. At the passage of the indicator impulse 32 through the upper triggering threshold $+U_{tr}$, the impulse conditioner 31 produces a conditioned crankshaft signal CkS with a constantly uniform amplitude, which disappears as the inductive generator signal $U_{ck}$ crosses the lower triggering threshold $U_{tr}$. FIG. 5*b* shows how the amplitude of parasitic impulses increases with rising speeds and how these parasitic impulses pass over the triggering thresholds $+U_{tr}$ or $-U_{tr}$ and result in crankshaft signals CkS uncoordinated with any indicator signals.

Figure 6:
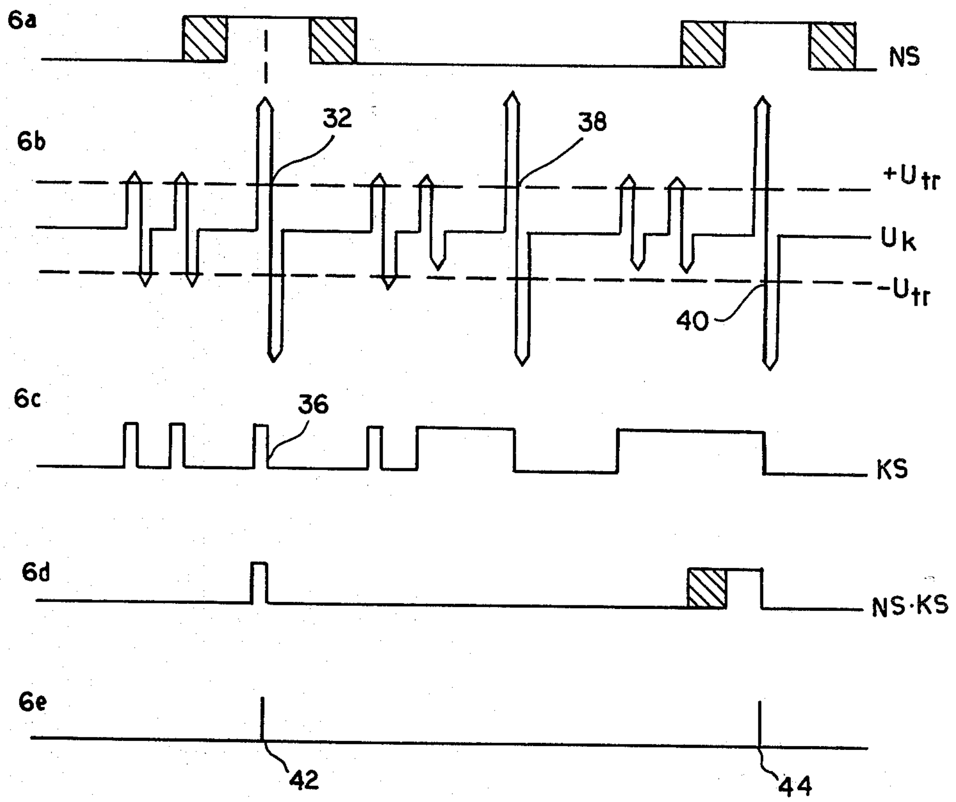
FIG. 6 is an impulse diagram with the elimination of parasitic impulses.

FIG. 6 shows the manner in which the slotted 12 disk 8 illustrated in FIG. 1 eliminates the false crankshaft signals CkS. In graph 6*a*, the camshaft signal CmS generated by the Hall generator is represented as a window over the indicator impulse 32 and the corresponding crankshaft signal 36. As the camshaft rotates at one half of the speed of the crankshaft, only every second indicator impulse falls into such a window, so that indicator impulse 38 for instance is screened out. Furthermore, all parasitic impulses situated outside the window and which cross the triggering threshold are eliminated by the AND gate placed between the camshaft signal CmS and the crankshaft signal CkS. The hatched area of the camshaft signal CmS in graph 6*a* refers to a possible migration of the window in relation to the indicator impulse 32 resulting from a play in the gear transmission between the crankshaft and the camshaft. In determining the characteristics of the slot 12 in FIG. 1 and effecting whatever adjustments may become necessary, this play has to be taken into consideration in order to make certain that the indicator impulse appear even under unfavorable conditions within the limits of the window. The problem is illustrated on the right sides of graphs 6*a* through 6*c* where a case is exemplified in which parasitic impulses pass over the upper triggering threshold but not over the lower triggering threshold. This leads to the graduated functions of crankshaft signal CkS shown in graph 6*c* and also to the graduated signals egressing from the AND gate 30 as shown on the right side of graph 6*d*. Such graduated signals, however, always end when the indicator impulse traverses the lower triggering threshold, an event shown in graph 6*b* to occur at Point 40. The control devices which follow in the circuitry the reference-signal-generator described hereby, should be designed in such a manner that the descending flank of signal CmS-CkS emitted by the AND gate (diagram 6*d*) is used as reference sinal. Thus reference points 42 and 44 appear in graph 6*e* which unequivocally indicate the passage of the indicator impulse over the lower triggering threshold and always correspond to a determined state in the operation of an internal combustion engine.

Figure 7:
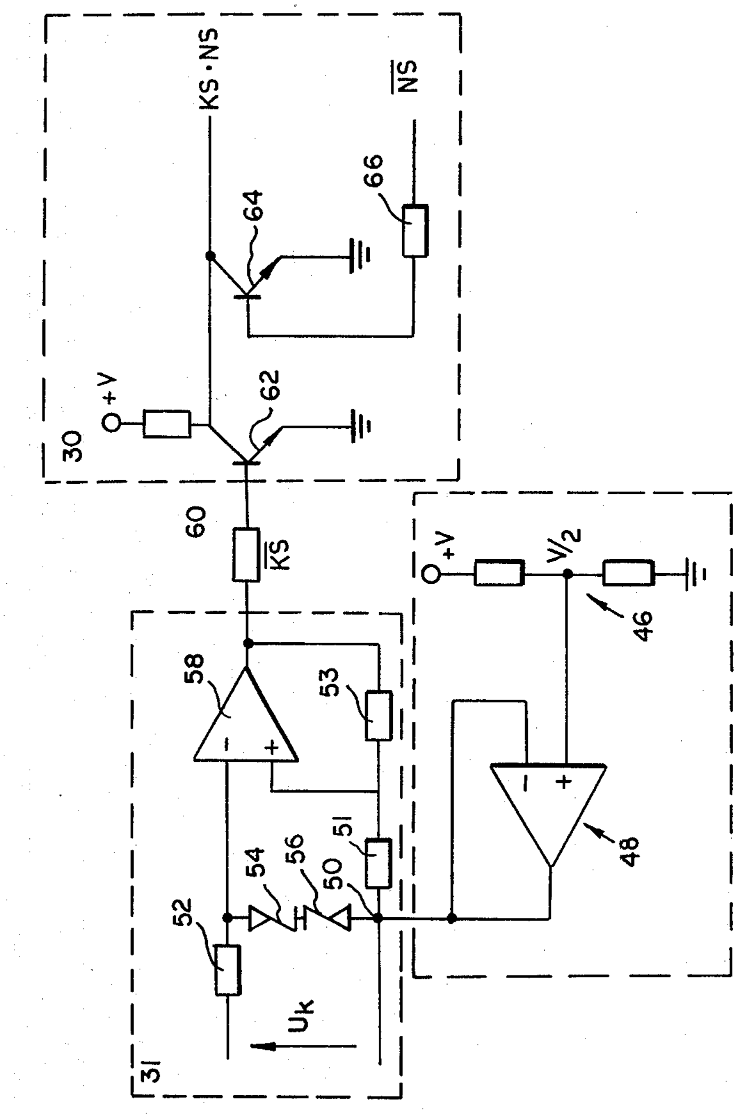
FIG. 7 is a diagram which shows the entire electronic circuitry.

FIG. 7 represents a simple circuit for processing signal $U_{ck}$ into crankshaft signal CkS and for the combination of the latter by means of the AND gate with camshaft signal CmS. A voltage divider 46 is connected to a stabilizing circuit 48 designed to generate a stabilized median potential. This median potential is supplied to the impulse conditioning unit 31 at point 50. The impulse conditioning unit consists of the input connections receiving the signal produced by the inductive generator ($U_{ck}$), a pre-resistor 52, two decimal diodes 54 and 56 set in a contrary sense and fed by the current of median potential and finally an amplifier 58 connected is parallel with the decimal diodes 54 and 56 and provided with positive feedback through resistor 53. The output of the amplifier 58 is connected through a resistance 60 with the base of a transistor 62. The transistor is connected in parallel with another transistor 64 the base of which is connected through a resistance 66 with the Hall generator 16.

The circuit functions as follows:

A signal $U_{ck}$ produced by the inductive generator has at each impulse of the inductive generator 28 a positive and a negative peak. By feeding these impulse peaks into the circuit at point 50, their median tension is limited to one half of the input voltage for the entire circuit. The peak voltages of $U_{ck}$ are limited by means of the two opposing decimal diodes 54 & 56 for the protection of the amplifier 58. The $U_{tr}$ triggering thresholds are formed in the amplifier and at the output of said amplifier is the crankshaft signal CkS generated. Because of its positive feedback, the amplifier oscillates between the positive and negative states of saturation according to the intensity of the prevailing $U_{ck}$ signal and thus the rectangular signals of the crankshaft impulses CkS originate. The height of the triggering threshold is determined by means of the resistances 51 and 53. Consequently the crankshaft signal CkS is formed at resistance 60 as indicated in graph 6*c* (in this particular circuit with a negative sign). At the appearance of signal CkS, transistor 62 of the AND gate 30 closes. If now, additionally, there also is a CmS signal present at the base of transistor 64, this transistor 64 will also close and, as shown in diagram 6*d*, the input voltage +V will be emitted by the AND gate 30 as signal CkS-CmS.

A circuit following immediately the AND gate 30 could use the descending flanks of signal CkS-CmS to form the spike pulses shown in diagram 6*e*. However, these needle impulses are generally formed in the input circuit of the control unit connected to the circuit in which the reference signal is generated.

I claim:

1. A device for generating a reference signal corresponding to a predetermined state in the operation of a four-cycle internal combustion engine and more particularly an internal combustion engine with an odd number of cylinders having an impulse generator with a post-connected triggering threshold which in a given position of the crankshaft emits an indicator signal used for the production of the reference signal, said device comprising a signal generator which emits an H signal during a first angle range of a shaft rotating at one half the speed of the crankshaft and a zero signal during a second angle range whereby the positions of the first angle range and of the second angle range are so selected that the indicator signals (CkS) alternately appear during an H and during a zero signal, and an AND gate connected to said signal generator and at the output of which the reference signal appears when the input coincidentally receives both an indicator signal and an H signal.

2. The device defined in claim 1 wherein the position of the first angle range is such that the H signal (CmS) begins in relation to the duration of one revolution of the crankshaft shortly before the start of an indicator signal (CkS).

3. The device defined in claim 1 wherein the size of the first angle range is such that the H signal (CmS) ends shortly after an indicator signal (CkS).

4. The device defined in claim 1, claim 2 or claim 3 wherein said internal combustion engine is equipped with a spark distributor, said impulse generator being an inductive generator, and said signal generator comprising a Hall generator activated by a slotted disk connected with and driven by a camshaft of said engine whereby the widths of the disk slots corresponds to the size of the first angle range.

* * * * *